United States Patent [19]

Cozewith et al.

[11] Patent Number: 4,978,720
[45] Date of Patent: Dec. 18, 1990

[54] OLEFINIC CHLOROSILANE AND OLEFINIC HALIDE FUNCTIONAL GROUP CONTAINING POLYMERS AND METHOD OF FORMING THE SAME

[75] Inventors: Charles Cozewith, Westfield; Shiaw Ju, Edison; Gary W. Verstrate, Matawan, all of N.J.

[73] Assignee: Exxon Research and Engineering Company, Linden, N.J.

[21] Appl. No.: 209,198

[22] Filed: Jun. 20, 1988

Related U.S. Application Data

[63] Continuation of Ser. No. 813,980, Dec. 27, 1985, abandoned, which is a continuation-in-part of Ser. No. 681,950, Dec. 14, 1984, which is a continuation-in-part of Ser. No. 785,726, Oct. 10, 1985, Pat. No. 4,540,753.

[51] Int. Cl.$^5$ .......................................... C08F 275/00
[52] U.S. Cl. ................................... 525/288; 525/289; 525/292; 526/87
[58] Field of Search .................. 526/87; 525/288, 289, 525/292

[56] References Cited

U.S. PATENT DOCUMENTS

| | | |
|---|---|---|
| 3,375,236 | 3/1968 | Castle et al. . |
| 3,522,180 | 7/1970 | Sweeney et al. . |
| 3,551,336 | 12/1970 | Jacobson et al. . |
| 3,625,658 | 7/1971 | Closon . |
| 3,681,306 | 8/1972 | Wehner . |
| 3,691,078 | 9/1972 | Johnston et al. . |
| 3,697,429 | 10/1972 | Engel et al. . |
| 3,706,697 | 12/1972 | Backderf ............................ 525/288 |
| 3,790,480 | 2/1974 | Campbell et al. . |
| 3,959,409 | 5/1976 | Freze et al. ........................ 525/247 |
| 4,065,520 | 12/1977 | Bailey et al. . |
| 4,135,044 | 9/1978 | Beals . |
| 4,153,765 | 5/1979 | Tsai . |
| 4,874,820 | 10/1989 | Cozewith et al. . |
| 4,882,406 | 11/1989 | Cozewith et al. . |

FOREIGN PATENT DOCUMENTS

60-206806 10/1985 Japan .

OTHER PUBLICATIONS

E. Junghanns, A. Gumboldt, and G. Bier, *Makromol. Chem.*, vol. 58, "Polymerization of Ethylene and Propylene to Amorphous Copolymers with Catalysts of Vanadium Oxychloride and Alkyl Aluminum Halides", (1962), pp. 18–42.

J. F. Wehner, *Chemical Reaction Engineering-Houston*, "Laminar Flow Polymerization of FPDM Polymer: ACS Symposium Series", 65, (1978), pp. 140–152.

Yutaka Mitsuda, John L. Schrag, and John D. Ferry, *Journal of Applied Polymer Science*, vol. 18, "Estimation of Long-Chain Branching in Ethylene-Propylene Terpolymers from Infinite-Dilution Viscoelastic Properties," John Wiley & Sons, Inc., (1974), pp. 193–202.

C. K. Shih, *Transaction of the Society of Rheology*, vol. 14, "The Effect of Molecular Weight and Molecular Weight Distribution of the Non-Newtonian Behavior of Ethylene-Propylene-Diene Polymers," John Wiley & Sons, Inc., (1970), pp. 83–114.

C. Cozewith and G. VerStrate, *Macromolecules*, vol. 4, "Ethylene-Propylene Copolymers, Reactivity Ratios, Evaluation, and Significance", (1971), pp. 482–489.

M. Cantow, Editor, *Academic*, "Polymer Fractionation", (1967), pp. 341ff.

H. Inagaki and T. Tanaku, *Developments in Polymer Characterization*, vol. 3, 1, (1982).

1981 MMI International Symposium on "*Transition Metal Catalyzed Polymerizations*", Unsolved Problems.

Makromol. Chem., Rapid Commun. 3, 225–229, (1982), Doi, Y., Ueki, S., *Block Copolymerization of Propylene and Ethylene with the "Living"*. . . .

Cazes, J., Editor, *Liquid Chromatography of Polymers and Related Materials III*, Marcel Dekker, 1981, "On Line Determination by Light Scattering of Mechanical Degradation in the GPC Process", Rooney, J. G. and VerStrate, G., p. 207.

Primary Examiner—Lewis T. Jacobs
Assistant Examiner—R. Dean, Jr.
Attorney, Agent, or Firm—W. G. Muller

[57] ABSTRACT

Copolymers comprising ethylene, alpha-olefin, and olefinic chlorosilane or olefinic hydrocarbon halide, and method of preparing copolymers. The copolymers may be in the form of statistical copolymers, or may be formed of first and second segments. The copolymers are useful in fiberglass and rubber compositions, and for forming graft and block polymers. The copolymers may be cross-linked to form nodular copolymers. The nodular copolymers are particularly useful as lube oil additives.

11 Claims, No Drawings

OLEFINIC CHLOROSILANE AND OLEFINIC HALIDE FUNCTIONAL GROUP CONTAINING POLYMERS AND METHOD OF FORMING THE SAME

CROSS REFERENCE TO RELATED APPLICATIONS

This is a continuation of application Ser. No. 813,980 filed Dec. 27, 1985 now abandoned which in turn is a continuation-in-part of U.S. application Ser. No. 681,950, filed on Dec. 14, 1984, which in turn is a continuation-in-part of Ser. No. 504,582 filed June 15, 1983 now U.S. Pat. No. 4,540,753 (hereinafter referred to as COZEWITH et al), issued on Sept. 10, 1985, the disclosures of which are hereby incorporated by reference thereto.

BACKGROUND OF THE INVENTION

1. Field of the Invention

The present invention relates to novel alpha-olefin copolymers and methods of making the same, as well as to methods of nodularizing and cross-linking the copolymer chains to form cross-linked copolymers having particular utilities.

More specifically, the invention relates to novel copolymers of ethylene, another alpha-olefin, at least one halogen-containing monomer, selected from olefinic chlorosilanes and olefinic hydrocarbon halides, and, optionally, one or more non-conjugated dienes.

These copolymers may be in the form of statistical (random) polymers, or they may be segmented in the form of a continuous or discontinuous first segment comprising ethylene and alpha-olefin, and a continuous or discontinuous segment comprising ethylene, alpha-olefin, and the at least one halogen-containing monomer.

In particular, the present invention relates to a process for making these copolymers and, optionally, for coupling them with the use of a cross-linking agent.

Where the copolymer is segmented, the cross-linked copolymers may be in nodular form. In this nodular form, the cross-linking agents may themselves contain functional groups with dispersant character.

The invention further relates to graft and block polymers formed from the copolymer chains, where the at least one halogen-containing monomer is an olefinic chlorosilane or olefinic hydrocarbon halide, and to a process for making such graft polymers.

The copolymers of the present invention are preferably of narrow molecular weight distribution. The composition of the copolymer chains can be "tailored". Among the compositional factors which can be controlled are the sequencing of the monomers and their relative proportions in the chains, portion and frequency of cross-linking, and the composition and positioning of additional substituents within as well as branching from the chain, according to the process of the invention. For example, the olefinic chlorosilanes and olefinic hydrocarbon halides can be confined to specific segments of the chains.

Where a tubular reactor is utilized in the process of the invention, a significant means for accomplishing such tailoring is by varying the locations along the reactor for introducing reactants, as well as the composition, proportions, and flow rates of the reactants.

The noncross-linked statistical and segmented copolymers of the present invention are useful for coating inorganic substrates; they have utility in applications with fiberglass and filled rubber compositions. The noncross-linked statistical and segmented olefinic chlorosilane or olefinic halide copolymers can be coupled to form unusual branched structures; they have utility as intermediates in forming graft and block polymers to prepare such compositions as thermoplastic elastomers and compatibilizers.

Cross-linked statistical copolymers of the present invention are useful in numerous elastomeric applications, such as the preparation of sheeting caulks, sealants, gaskets, etc. The nodular copolymers have utility in lube oil compositions as oil additives.

2. Background Description of Relevant Materials

For convenience, certain terms that are repeated throughout the present specification are defined below:

(a) Inter-CD defines the compositional variation, in terms of ethylene content, among polymer chains. It is expressed as the minimum deviation (analogous to a standard deviation) in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number, for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

(b) Intra-CD is the compositional variation, in terms of ethylene, within a copolymer chain. It is expressed as the minimum difference in weight (wt.) % ethylene that exists between two portions of a single copolymer chain, each portion comprising at least 5 weight % of the chain.

(c) Molecular weight distribution (MWD) is a measure of the range of molecular weights within a given copolymer sample. It is characterized in terms of at least one of the ratios of weight average to number average molecular weight, $\overline{M}_w/\overline{M}_n$, and Z average to weight average molecular weight, $\overline{M}_z/\overline{M}_w$, where $$M_w = \Sigma\, NiMi^2$$
$$\phantom{M_w =}\ \Sigma\, NiMi$$
$$M_n = \Sigma\, NiMi, \text{ and}$$
$$\phantom{M_n =}\ \Sigma\, Ni$$
$$M_z = \Sigma\, NiMi^3, \text{ wherein}$$
$$\phantom{M_z =}\ \Sigma\, NiMi^2$$

$\overline{Ni}$ the number of molecules of weight $\overline{Mi}$.

(d) Viscosity Index (V.I.) is the ability of a lubricating oil to accommodate increases in temperature with a minimum decrease in viscosity. The greater this ability, the higher the V.I.

Ethylene-propylene copolymers, particularly elastomers, are important commercial products. Two basic types of ethylene-propylene copolymers are commercially available. Ethylene-propylene copolymers (EPM) are saturated compounds requiring vulcanization with free radical generators such as organic peroxides. Ethylene-propylene terpolymers (EPDM) contain a small amount of non-conjugated diolefin, such as dicyclopentadiene; 1,4-hexadiene or ethylidene norbornene, which provides sufficient unsaturation to permit vulcanization with sulfur. Such polymers that include at least two monomers, i.e., EPM and EPDM, will hereinafter be collectively referred to as copolymers.

These copolymers have outstanding resistance to weathering, good heat aging properties and the ability to be compounded with large quantities of fillers and plasticizers, resulting in low cost compounds which are particularly useful in automotive and industrial mechanical goods applications. Typical automotive uses are in tire sidewalls, inner tubes, radiator and heater hose, vacuum tubing, weather stripping and sponge doorseals, and as Viscosity Index (V.I.) improvers for lubricating oil compositions. Typical mechanical uses are in appliances, industrial and garden hoses, both molded and extruded sponge parts, gaskets and seals, and conveyor belt covers. These copolymers also find use in adhesives, appliance parts, hoses and gaskets, wire and cable insulation, and plastics blending.

As can be seen from the above, based on their respective properties, EPM and EPDM find many, varied uses. It is known that the properties of such copolymers which make them suited for use in a particular application are, in turn, determined by their composition and structure. For example, the ultimate properties of an EPM or EPDM copolymer are determined by such factors as composition, compositional distribution, sequence distribution, molecular weight, and molecular weight distribution (MWD).

The efficiency of peroxide curing depends on composition. As the ethylene level increases, it can be shown that the "chemical" crosslinks per peroxide molecule increase. Ethylene content also influences the rheological and processing properties, because crystallinity, which acts as physical crosslinks, can be introduced. The crystallinity present at very high ethylene contents may hinder processability, and may make the cured product too "hard" at temperatures below the crystalline melting point to be useful as a rubber.

Milling behavior of EPM or EPDM copolymers varies radically with MWD. Narrow MWD copolymers crumble on a mill, whereas broad MWD materials will band under conditions encountered in normal processing operations. At the shear rates encountered in processing equipment, broader MWD copolymer has a substantially lower viscosity than narrower MWD polymer of the same weight average molecular weight.

Thus, there exists a continuing need for discovering polymers with unique properties and compositions. This is easily exemplified with reference to the area of V.I. improvers for lubricating oils.

A motor oil should not be too viscous at low temperatures so as to avoid serious frictional losses, facilitate cold starting, and provide free oil circulation right from engine startup. On the other hand, it should not be too thin at working temperatures so as to avoid excessive engine wear and excessive oil consumption. It is most desirable to employ a lubricating oil which experiences the least viscosity change with changes in temperature.

The ability of a lubricating oil to accommodate increases in temperature with a minimum decrease in viscosity is indicated by its Viscosity Index (V.I.). The greater this ability, the higher the V.I.

Polymeric additives have been extensively used in lubricating oil compositions to impart desirable viscosity temperature characteristics to the compositions. For example, lubricating oil compositions which use EPM or EPDM copolymers or, more generally, ethylene—$(C_3-C_{18})$ alpha-olefin copolymers, as V.I. improvers are well known. These additives are designed to permit formulation of lubricating oils so that changes in viscosity occurring with variations in temperature are kept as small as possible. Lubricating oils containing such polymeric additives can better maintain their viscosity at higher temperatures, while at the same time maintaining desirable low viscosity fluidity at engine starting temperatures.

Two important properties (although not the only required properties as is known) of these additives relate to low temperature performance and shear stability. Low temperature performance relates to maintaining low viscosity at very low temperatures, while shear stability relates to the resistance of the polymeric additives to being broken down into smaller chains.

Ideally, preferred V.I. improvers are polymers which have good shear stability. These polymers generally have low thickening efficiency and low molecular weight. However, generally, low molecular weight polymers have low bulk viscosity and exhibit cold flow. They are difficult to handle in the conventional rubber processing plant.

It has been found that when operated carefully certain reactors can be used to polymerize alpha-olefins so as to enhance their various properties on a selective basis to suit their intended use. Reactors which are most suitable within the context of the instant invention are mix-free tubular and batch reactors.

Representative prior art dealing with tubular reactors to make copolymers are as follows:

In "Polymerization of ethylene and propylene to amorphous copolymers with catalysts of vanadium oxychloride and alkyl aluminum halides"; E. Junghanns, A. Gumboldt and G. Bier; Makromol. Chem., v. 58 (12/12/62): 18–42, the use of a tubular reactor to produce ethylene-propylene copolymer is disclosed in which the composition varies along the chain length. More specifically, this reference discloses the production in a tubular reactor of amorphous ethylene-propylene copolymers using Ziegler catalysts prepared from vanadium compound and aluminum alkyl. It is disclosed that at the beginning of the tube ethylene is preferentially polymerized, and if no additional make-up of the monomer mixture is made during the polymerization, the concentration of monomers changes in favor of propylene along the tube. It is further disclosed that since these changes in concentrations take place during chain propagation, copolymer chains are produced which contain more ethylene on one end than at the other end. It is also disclosed that copolymers made in a tube are chemically non-uniform, but fairly uniform as regards molecular weight distribution. Using the data reported in their FIG. 17 for copolymer prepared in the tube, it was estimated that the $\overline{M}_w/\overline{M}_n$ ratio for this copolymer was 1.6, and from their FIG. 18 that the intermolecular compositional dispersity (Inter-CD, explained in detail below) of this copolymer was greater than 15%.

"Laminar Flow Polymerization of EPDM Polymer"; J. F. Wehner; *ACS Symposium Series* 65 (1978); pp 140–152 discloses the results of computer simulation work undertaken to determine the effect of tubular reactor solution polymerization with Ziegler catalysts on the molecular weight distribution of the polymer product. The specific polymer simulated was an elastomeric terpolymer of ethylene-propylene-1,4-hexadiene.

On page 149, it is stated that since the monomers have different reactivities, a polymer of varying composition is obtained as the monomers are depleted. However, whether the composition varies inter- or intramolecularly is not distinguished. In Table III on page 148, various polymers having $\overline{M}_w/\overline{M}_n$ of about 1.3 are predicted. In the third paragraph on page 144, it is stated that as the tube diameter increases, the polymer molecular weight is too low to be of practical interest, and it is predicted that the reactor will plug. It is implied in the first paragraph on page 149 that the compositional dispersity produced in a tube would be detrimental to product quality.

U.S. Pat. No. 3,681,306 to Wehner is drawn to a process for producing ethylene/higher alpha-olefin copolymers having good processability, by polymerization in at least two consecutive reaction stages. According to this reference, this two-stage process provides a simple polymerization process that permits tailor-making ethylene/alpha-olefin copolymers having predetermined properties, particularly those contributing to processability in commercial applications such as cold-flow, high green strength and millability. According to this reference, the inventive process is particularly adapted for producing elastomeric copolymers, such as ethylene/propylene/5-ethylidene-2-norbornene, using any of the coordination catalysts useful for making EPDM. The preferred process uses one tubular reactor followed by one pot reactor. However, it is also disclosed that one tubular reactor could be used, but operated at different reaction conditions to simulate two stages. As is seen from column 2, lines 14–20, the inventive process makes polymer of broader MWD than those made in a single stage reactor. Although intermediate polymer from the first (pipeline) reactor is disclosed as having a ratio of $\overline{M}_w/\overline{M}_n$ of about 2, as disclosed in column 5, lines 54–57, the final polymers produced by the inventive process have an $\overline{M}_w/\overline{M}_n$ of 2.4 to 5.

U.S. Pat. No. 3,625,658 to Closon discloses a closed circuit tubular reactor apparatus with high recirculation rates of the reactants, which can be used to make elastomers of ethylene and propylene. With particular reference to FIG. 1, a hinged support 10 for vertical leg 1 of the reactor allows for horizontal expansion of the bottom leg thereof and prevent harmful deformations due to thermal expansions, particularly those experienced during reactor clean out.

U.S. Pat. No. 4,065,520 to Bailey et al. discloses the use a of batch reactor to make ethylene copolymer, including elastomers, having broad compositional distributions. Several feed tanks for the reactor are arranged in series, with the feed to each being varied to make the polymer. The products made have crystalline to semi-crystalline to amorphous regions and gradient changes in between. The catalyst system can use vanadium compounds alone or in combination with titanium compound and is exemplified by vanadium oxy-trichloride and diisobutyl aluminum chloride. In all examples titanium compounds are used. In several examples hydrogen and diethyl zinc, known transfer agents, are used. The polymer chains produced have a compositionally dispersed first length and uniform second length. Subsequent lengths have various other compositional distributions.

In "Estimation of Long-Chain Branching in Ethylene-Propylene Terpolymers from Infinite-Dilution Viscoelastic Properties"; Y. Mitsuda, J. Schrag, and J. Ferry; *J. Appl. Pol. Sci.*, 18, 193 (1974) narrow MWD copolymers of ethylene-propylene are disclosed. For example, in Table II on page 198, EPDM copolymers are disclosed which have $\overline{M}_w/\overline{M}_n$ of from 1.19 to 1.32.

In "The Effect of Molecular Weight and Molecular Weight Distribution on the Non-Newtonian Behavior of Ethylene-Propylene-Diene Polymers" *Trans. Soc. Rheol.*, 14, 83 (1970); C. K. Shih, a whole series of compositionally homogeneous fractions were prepared and disclosed. For example, the data in Table I discloses polymer Sample B having a high degree of homogeneity. Also, based on the reported data, the MWD of the sample is very narrow. However, the polymers are not disclosed as having intramolecular dispersity.

Representative prior art dealing with ethylene-alpha-olefin copolymers as lubricating oil additives are as follows:

U.S. Pat. No. 3,697,429 to Engel et al. discloses a blend of ethylene-propylene copolymers having different ethylene contents, i.e., a first copolymer of 40–83 wt. % ethylene and $\overline{M}_w/\overline{M}_n$ less than about 4.0 (preferably less than 2.6, e.g. 2.2) and a second copolymer of 3–70 wt. % ethylene and $\overline{M}_w/\overline{M}_n$ less than 4.0, with the content of the first differing from the second by at least 4 wt. % ethylene. These blends, when used as V.I. improvers in lubricating oils, provide suitable low temperature viscosity properties with minimal adverse interaction between the oil pour depressant and the ethylene-propylene copolymer.

U.S. Pat. No. 3,522,180 discloses copolymers of ethylene and propylene, having a number average molecular weight of 10,000 to 40,000 and a propylene content of 20 to 70 mole percent, as V.I. improvers in lube oils. The preferred $\overline{M}_w/\overline{M}_n$ of these copolymers is less than about 4.0.

U.S. Pat. No. 3,691,078 to Johnston et al. discloses the use of ethylene-propylene copolymers containing 25–55 wt. % ethylene, which have a pendent index of 18–33 and an average pendent size not exceeding 20 carbon atoms, as lube oil additives. The $\overline{M}_w/\overline{M}_n$ is less than about 8. These additives impart to the oil good low temperature properties with respect to viscosity without adversely affecting pour point depressants.

U.S. Pat. No. 3,551,336 to Jacobson et al. discloses the use of ethylene copolymers of 60–80 mole % ethylene, having no more than 1.3 wt. % of a polymer fraction which is insoluble in normal decane at 55° C., as oil additives. Minimization of this decane-insoluble fraction in the polymer reduces the tendency of the polymer to form haze in the oil, which haze is evidence of low temperature instability probably caused by adverse interaction with pour depressant additives. The $\overline{M}_w/\overline{M}_n$ of these copolymers is "suprisingly narrow" and is less than about 4.0, preferably less than 2.6, e.g., 2.2.

In the case of viscosity index improvers, random cross-linking is neither a necessary nor desirable characteristic of the polymer. Illustrative of the patents dealing with unsaturated branched ethylene ter- and tetrapolymers in U.S. Pat. No. 3,790,480. Polymers of ethylene, $C_3$–$C_{18}$ higher alpha-olefins and two classes of dienes are taught, the dienes having double bonds of the same or different polymerizability. In one class of dienes represented by 1,4-hexadiene, only one of the double bonds is readily polymerizable by the catalyst used. In another class of which 2,5-norbornadiene is representative, both double bonds are polymerizable utilizing the polymerization process of the patent. It is taught that the preferred viscosity index improvers are ethylene tetrapolymers wherein both classes of double bonds are used. Such polymers contain diene along the full length of the chain and are not nodularly branched. Random branching does not improve shear stability at a given TE in the effective manner of nodular branching.

Presumably, superior properties are achieved because use of a diene with two active double bonds results in long chain branching, with a concomitant increase in bulk viscosity of the polymer, but without any significant increase intrinsic viscosity or thickening efficiency. Increased bulk viscosity facilitates the manufacture and storage of the polymer. The catalyst used for polymerization is a Ziegler type catalyst. Both double bonds of the 2,5-norbornadiene are polymerizable by the Ziegler catalyst. The other diene, 1,4-hexadiene, however, has only one Ziegler catalyst polymerizable double bond. Hence, the polymers include a minor amount of unsaturation.

SUMMARY OF THE INVENTION

The objectives of the invention are achieved according to the invention which provides a copolymer of:
(1) ethylene;
(2) an alpha-olefin; and
(3) at least one halogen-containing monomer selected from the group consisting of:
(a) olefinic chlorosilane of the formula $SiRR'_xCl_{3-x}$ wherein:
(i) X is in the range 0-2;
(ii) R is a Ziegler copolymerizable olefin; and
(iii) R' is a hydrocarbon with 1-30 carbon atoms selected from the group consisting of saturated or unsaturated as well as branched or unbranched aliphatic, aromatic, cyclic, and polycyclic hydrocarbons;
(b) an olefinic hydrocarbon halide of the formula RR'X wherein;
(i) R is A Ziegler copolymerizable olefin;
(ii) R' is a hydrocarbon with 1-30 carbon atoms selected from a group consisting of the saturated or unsaturated as well as branched or unbranched aliphatic, aromatic, cyclic, and polycyclic hydrocarbons; and
(iii) X is a halogen.

The R Ziegler copolymerizable olefin may be selected from the group consisting of norbornenyl, dicyclopentenyl, and 1-hexenyl.

Among the olefinic chlorosilanes having utility in the copolymers in this invention are those with the formula $CH_2=CH-(CRR')_n-SiR_xCl_{3-x}$ wherein:
(i) X is in the range 0-2;
(ii) n is greater than or equal to 0
(iii) R and R' are the same or different,
and each of R and R' is a hydrocarbon with 1-30 carbon atoms selected from the group consisting of saturated or unsaturated as well as branched or unbranched aliphatic, aromatic, cyclic, and polycyclic hydrocarbons. Particular olefinic chlorosilanes of this formular are vinyl dimethylchlorosilane, vinyl ethyl dichlorosilane, 5-1-hexenyl-6-dimethylchlorosilane, 1-hexenyl-6-trichlorosilane, 1-octenyl-8-trichlorosilane, phenyl allyldichlorosilane, 5-trichlorosilyl-2-norbornene, and 5-methyldichlorosilyl-2-norbornene.

The olefinic hydrocarbon halides may be chlorides and bromides. Particular olefinic halides having utility in the copolymers in the invention are 5-chloromethyl-2-norbornene and 2-parachloromethylphenyl-5-norbornene.

The copolymers of the present invention may further include at least one non-conjugated diene. Preferred dienes include 5-ethylidene-2-norbornene, 1,4-hexadiene, and dicyclopentadiene, and mixtures thereof.

One significant aspect of the invention is directed to a copolymer chain having a first segment comprising a copolymer of ethylene and alpha-olefin, and a second segment comprising a copolymer of ethylene, alpha-olefin, and said at least one halogen-containing monomer; both the first and second segments are in the form of one contiguous segment or a plurality of discontinuous segments, and the second segment constitutes less than 50 percent by weight of the copolymer chain. Further, the at least one halogen-containing monomer is cross-linkable under conditions which do not cross-link said first segment to any substantial extent.

In one embodiment of this segmented copolymer of the present invention, the first segment comprises the center of the copolymer chain, and the second segment comprises two segments one at each end of the chain.

The invention is further directed to a composition consisting essentially of a plurality of the indicated segmented copolymer chains having at least one of $\overline{M}_w/\overline{M}_n$ less than 2 and $\overline{M}_z/\overline{M}_w$ less than 1.8.

The first segments preferably have $\overline{M}_w/\overline{M}_n$ less than 2 and $\overline{M}_z/\overline{M}_w$ less than 1.8.

The invention is further directed to a process of forming a copolymer chain comprising said first and second segments. The process comprises forming the first segment by polymerizing a reaction mixture of ethylene and alpha-olefin to the point that the weight of the resulting ethylene-alpha-olefin copolymer has reached 50% of the anticipated polymer weight at completion of the polymerization, so as to form said first segment, and forming the second segment by incorporating at least one halogen-containing monomer into the reaction mixture to form the second segment.

In one embodiment, a copolymer chain consisting of substantially one first segment and substantially one second segment is prepared by first conducting the step for preparing the first segment until completion of this step, and then conducting the step for preparing the second segment.

In another embodiment, the second segment can be formed in the first step by polymerizing a reaction mixture of ethylene, alpha-olefin, and at least one halogen-containing monomer to the point at which the reaction of the at least one halogen-containing monomer is substantially complete and the weight of the resulting ethylene-alpha-olefin-halogen-containing monomer copolymer is less than 50% of the anticipated polymer weight at completion of polymerization, and then continuing the reaction to form the first segment; in this embodiment of the process, the resulting copolymer chain will consist essentially of substantially one first segment and substantially one second segment.

At least one non-conjugated diene may be added to the reaction mixture for producing the copolymer chains of this invention.

The process may further include the step of incorporating at least one of additional ethylene, alpha-olefin, non-conjugated diene, and halogen-containing monomer into the reaction mixture after initiation of the polymerization.

In a preferred embodiment of the process of the invention, the ethylene, alpha-olefin, and at least one halogen-containing monomer reaction mixture are polymerized with essentially one catalyst species in at least one mix-free reactor, in such a manner and under conditions sufficient to initiate propagation of substantially all the copolymer chains simultaneously to form the plurality of copolymer chains; these resulting copolymer chains are dispersed within the reaction mixture, which is essentially transfer-agent free.

Preferably, the at least one mix-free reactor is a tubular reactor. Further, additional reaction mixture comprising at least one of ethylene, other alpha-olefin monomer, non-conjugated diene, and the at least one halogen-containing monomer may be injected at least one location along the reactor.

Alternatively, a batch reactor may be used.

The preferred alpha-olefin used in the reaction is propylene.

The previously indicated copolymer chain comprising the first segment as the center of the chain and a second chain segment at either end of the chain can be prepared in this process by introducing a reaction mixture of ethylene, propylene, and at least one halogen-containing monomer into the reactor at the inlet, then introducing a reaction mixture having at least one of ethylene and propylene at a first location along the reactor, and then introducing the at least one halogen-containing monomer into the reactor at a second location following the first location. Where the at least one halogen-containing monomer used in this process is an olefinic chlorosilane, the resulting copolymer chain can be reacted with a hydroxy terminated thermoplastic to form a thermoplastic elastomer.

Where the at least one halogen-containing monomer is an olefinic hydrocarbon halide, the resulting copolymer chain can be employed in reactions for producing graft and block polymers.

In one embodiment of the process for preparing such graft and block polymers, the copolymer chain is first reacted with a metalating agent, and then reacted with an anionically polymerizable monomer to form the graft polymer. The metalating agent may be selected from at least one of the group consisting of branched alkyl lithium and n-butyl lithium.

In another embodiment, the copolymer chain is first reacted with a Lewis acid, and then with a cationically polymerizable monomer to form the graft polymer. The Lewis acid may be selected from at least one of aluminum ethyl dichloride, boron trichloride, and aluminum trichloride.

Isobutylene may be employed as the cationically polymerizable monomer. Butadiene, isoprene, and styrene are both anionically and cationically polymerizable.

Another significant aspect of the invention is directed to compositions consisting essentially of a plurality of copolymer chains comprising ethylene, alpha-olefin, and at least one halogen-containing monomer having at least one of $\overline{M}_w/\overline{M}_n$ less than 2 and $\overline{M}_z/\overline{M}_w$ less than 1.8. Preferably, the chains have both of these properties.

One or more non-conjugated dienes may also be present. Dienes which are suitable include 5-ethylidene-2-norbornene, 1,4-hexadiene, and dicyclopentadiene.

The inter-CD is such that 95 weight percent of the copolymer chains have an ethylene composition that differs from the average weight percent composition by 15% or less, or preferably, 10% or less.

The intra-CD is such that at least two portions of each chain, each portion comprising at least 5 weight percent of the chain, differ in composition from one another by at least 5 weight percent ethylene, preferably at least 10 weight percent ethylene, and most preferably at least 20 weight percent ethylene.

The invention is further directed to a composition consisting essentially of a plurality of copolymer chains of the invention where said plurality of copolymer chains are statistical copolymer chains.

The copolymer chains of the present invention having olefinic chlorosilane as the halogen-containing monomer have utility in fiberglass compositions comprising glass fibers and plastic matrix. Such copolymer chains of the present invention may be incorporated into these compositions by a process comprising coating the glass fibers with the polymer chains, and then incoporating this coated composition into a plastic matrix. Alternatively, a reaction mixture comprising the glass fibers, plastic matrix, and copolymer chains may first be formed, and then reacted to form the fiberglass composition.

In a further significant aspect of the present invention, the copolymer chains may be cured by reaction with cross-linking agents.

Where the halogen-containing monomer of the copolymer chain is olefinic chlorosilane, the cross-linking agent used may be at least one composition selected from a group consisting of water and polyfunctional proton donors. Suitable polyfunctional proton donors are polyfunctional alcohols, amines, polycarboxylic acids, and polythiols.

Where the halogen-containing monomer is olefinic hydrocarbon halide, the cross-linking agent is at least one composition selected from the group consisting of ZnO and polyfunctional nucleophiles. Suitable polyfunctional nucleophiles are diamines, polyamines other than diamines, and thiourea.

Cross-linking of the segmented copolymer chains of the present invention can be utilized to prepare nodular copolymers comprising nodule regions of substantial cross-linking of second segments, with substantially uncross-linked first segments extending therefrom. Substantially each of first and second segments in this nodular copolymer is in the form of one continuous segment or a plurality of discontinuous segments, and substantially each of said second segments constitutes less than 50% by weight of its copolymer chain.

The nodule regions of the nodular copolymers of the present invention can further include regions containing functional groups with dispersant character. Such nodular copolymers are prepared by incorporating, during the process for forming the nodular copolymers, agents having dispersant functionalities. These agents have dispersant groups comprising at least one of amides, pyridines, polycaprolactones, polycaprolactams, pyrrolidones, and imidazoles. These agents are attached by their dispersant groups to the polyfunctional cross-linking agents within the nodule.

Such nodular copolymers have utility in lubricating oil compositions. They are generally employed as additives in an amount of about 0.1 to about 15.0% by weight of the total lubricating oil composition.

DETAILED DESCRIPTION OF THE INVENTION

The present invention is drawn to a novel copolymer comprising ethylene, an alpha-olefin, a compound selected from the group consisting of at least one olefinic chlorosilane and at least one olefinic hydrocarbon halide, and, optionally, a non-conjugated diene.

The present invention relates to statistical as well as segmented copolymer chains comprising the above-cited components. The segmented chains preferably comprise a first segment of ethylene and an alpha-olefin, and a second segment of ethylene, an alpha-olefin, and the olefinic chlorosilane or olefinic hydrocarbon halide; each of the first and second segments can be in the form of one contiguous segment or a plurality of discontiguous segments.

The present invention further relates to cured compositions of said statistical and segmented copolymers. The curing step comprises cross-linking the copolymer chains with a cross-linking agent. Where the halogen-containing monomer in the copolymer is an olefinic chlorosilane, the cross-linking agent employed is selected from at least one composition selected from the group consisting of water and polyfunctional proton donors. Where the halogen-containing monomer in the copolymer is an olefinic hydrocarbon halide, the cross-linking agent is at least one composition selected from the group consisting of ZnO and polyfunctional nucleophiles.

The invention further relates to graft polymers formed with said statistical and segmented copolymers of the invention having an olefinic chlorosilane or olefinic hydrocarbon halide as the at least halogen-containing monomer. The halide-containing copolymer may be reactive with a cationic catalyst, such as a Lewis acid; the product of this reaction is then reacted with a cationically polymerizable monomer to form the graft polymer. Alternatively, the copolymer is reactive with a metalating agent, and the product of this reaction is reacted with an anionically polymerizable monomer to form the graft polymer.

The copolymer of the present invention having an olefinic chlorosilane as the at least one third compound can be reacted with a hydroxy terminated polymer, for example, polyester, to form a thermoplastic elastomer.

Cross-linking of segmented copolymers of the invention can result in nodular copolymer. Such nodular copolymer products may comprise a nodule region of substantially cross-linking of the second segments, with substantially uncross-linked first segments extending therefrom. Further, the cross-linking agents may themselves contain functional groups which exhibit dispersant character.

Suitable alpha-olefins include those containing 3–18 carbon atoms, e.g., propylene, butene-1, pentene-1, etc. Alpha-olefins of 3–6 carbons are preferred due to economic considerations. The most preferred alpha-olefin in accordance with the present invention is propylene.

The olefinic chlorosilane of the present invention has the formula

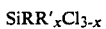

wherein x is in the range of 0–2, R is a Ziegler copolymerizable olefin, and R' is a hydrocarbon with 1–30 carbon atoms selected from the group consisting of saturated or unsaturated as well as branched or unbranched aliphatic, aromatic, cyclic, and polycyclic hydrocarbons. R may further be selected from the group consisting of norbornenyl, dicyclopentenyl, and 1-hexenyl. The chlorosilane may further be selected from the formula

wherein x is in the range 0–2, n is greater than or equal to 0, and R and R' are the same or different, each being a hydrocarbon with 1–30 carbon atoms selected from the group consisting of saturated or unsaturated as well as branched or unbranched aliphatic, aromatic, cyclic, and polycyclic hydrocarbons. In a preferred embodiment, the chlorosilane is selected from the group consisting of vinyl dimethyl chlorosilane, vinyl ethyl dichlorosilane, 5-hexenyldimethylchlorosilane, 5-hexenyltrichlorosilane, 7-octenyltrichlorosilane, and phenyl allyldichlorosilane.

In another embodiment, the at least one third compound may be an olefinic halide; the halide may be a chloride, or a bromide. Preferred olefinic halides are 5-parachloromethyl phenyl-2-norbornene and 5-chloromethyl-2-norbornene.

Typical of the non-conjugated dienes are the following:

(a) straight chain acyclic dienes such as: 1,4-hexadiene; 1,6-octadiene;

(b) branched chain acyclic dienes such as: 5-methyl-1,4-hexadiene; 3,7-dimethyl-1,6-octadiene; 3,7-dimethyl-1,7-octadiene and a mixed isomers of dihydromyrcene and dihydroocimene;

(c) single ring alicyclic dienes such as: 1,4-cyclohexadiene; 1,5-cyclooctadiene; and 1,5-cyclododecadiene;

(d) multi-ring alicyclic fused and bridged ring dienes such as: tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene (ENB), 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. Commercially used dienes are 5-ethylidene-2-norbornene (ENB), 1,4-hexadiene, dicyclopentadiene, and mixtures thereof.

The polyfunctional proton donors may be polyfunctional alcohols, amines, polycarboxylic acids, and polythiols.

Suitable polyfunctional nucleophiles are diamines, polyamines other than diamines, and thiourea.

Particular Lewis acids which may be used are aluminum ethyl dichloride, boron trichloride, and aluminum trichloride.

In grafting reactions, styrene may be employed as both the cationically anionically polymerizable monomer.

Another feature of polymer made in accordance with the present invention is that the molecular weight distribution (MWD) prior to grafting or cross-linking is preferably very narrow, as characterized by at least one of a ratio of $\overline{M}_w/\overline{M}_n$ of less than 2 and a ratio of $\overline{M}_z/\overline{M}_w$ of less than 1.8 for the whole polymer and the first chain segment. Particularly for oil additive applications, the preferred uncoupled copolymers have $\overline{M}_w/\overline{M}_n$ less than about 1.6, with less than about 1.4 being most preferred.

The preferred $\overline{M}_z/\overline{M}_w$ is less than about 1.5, with less than about 1.3 being most preferred.

It is known that the property advantages of copolymers in accordance with the present invention are related to these ratios. Small weight fractions of material can disproportionately influence these ratios while not significantly altering the property advantages which depend on them. For instance, the presence of a small weight fraction (e.g. 2%) of low molecular weight copolymer can depress $\overline{M}_n$, and thereby raise $\overline{M}_w/\overline{M}_n$ above 2 while maintaining $\overline{M}_z/\overline{M}_w$ less than 1.8. Therefore, the polymers, in accordance with the present invention, which are to be coupled, are characterized by having at least one of $\overline{M}_w/\overline{M}_n$ less than 2 and $\overline{M}_z/\overline{M}_w$ less than 1.8.

Copolymer in accordance with one embodiment of the present invention is preferably made in a tubular reactor. When the process takes place in a tubular reactor, it is known that, at the beginning of the tubular reactor, ethylene, due to its high reactivity, will be preferentially polymerized. However, the concentration of monomers changes along the tube in favor of propylene as the ethylene is depleted. The result is copolymer chains which are higher in ethylene concentration in the chain segments grown near the reactor inlet (as defined at the point at which the polymerization reaction commences), and higher in propylene concentration in the chain segments formed near the reactor outlet. An illustrative copolymer chain of ethylene-propylene is schematically presented below, with E representing ethylene constituents, and P representing propylene constituents in the chain:

breadth of the Inter-CD are known, as illustrated by Junghanns et al., wherein a p-xylene-dimethylformamide solvent/non-solvent was used to fractionate copolymer into fractions of differing intermolecular composition. Other solvent/non-solvent systems can be used, such as hexane-2-propanol, as will be discussed in more detail below.

The Inter-CD of copolymer in accordance with one embodiment of the present invention is such that 95 wt. % of the copolymer chains have an ethylene composition that differs from the average weight percent ethylene composition by 15 wt. % or less. The preferred Inter-CD is about 13% or less, with the most preferred being about 10% or less. In comparison, Junghanns et al. found that their tubular reactor copolymer had an Inter-CD of greater than 15 weight %.

Broadly, the Intra-CD of copolymer in accordance with one embodiment of the present invention is such that at least two portions of an individual intramolecularly heterogeneous chain, each portion comprising at least 5 weight percent of the chain, differ in composition from one another by at least 5 weight percent ethylene. Unless otherwise indicated, this property of Intra-CD as referred to herein is based upon at least two 5 weight percent portions of copolymer chain. The Intra-CD of copolymer in accordance with the present invention can be such that at least two portions of copolymer chain differ by at least 10 weight percent ethylene. Differences of at least 20 weight percent ethylene, as well as of at least 40 weight percent ethylene, are also considered to be in accordance with the present invention.

Segment: | 1 | 2 | 3 | 4 |
|---|---|---|---|---|

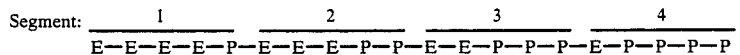

As can be seen from this illustrative schematic chain, the far left-hand segment (1) thereof represents that portion of the chain formed at the reactor inlet where the reaction mixture is proportionately richer in the more reactive constituent ethylene. This segment comprises four ethylene molecules and one propylene molecule. However, as subsequent segments are formed from left to right, with the more reactive ethylene being depleted and the reaction mixture proportionately increasing in propylene concentration, the subsequent chain segments become more concentrated in propylene. The resulting chain is intramolecularly heterogeneous.

In the event that more than halogen-containing monomers are used, i.e., an olefinic chlorosilane or olefinic hydrocarbon halide, for purposes of describing the present invention all properties related to homogeneity and heterogeneity will refer to the relative ratio of ethylene to the other monomers in the chain. The property, of the copolymer discussed herein, related to intramolecular compositional dispersity (compositional variation within a chain) shall be referred to as Intra-CD.

For copolymer chains in accordance with the present invention, composition can vary between chains as well as along the length of the chain. In one embodiment, an object of this invention is to minimize the amount of interchain variation. The Inter-CD can be characterized by the difference in composition between some fraction of the copolymer and the average composition, as well as by the total difference in composition between the copolymer fractions containing the highest and lowest quantity of ethylene. Techniques for measuring the The experimental procedure for determining Intra-CD is as follows. First the Inter-CD is established as described below, then the polymer chain is broken into fragments along its contour and the Inter-CD of the fragments is determined. The difference is the two results is due to Intra-CD, as can be seen in the illustrative example below.

Consider a heterogeneous sample polymer containing 30 monomer units. It consists of 3 molecules designated A, B, C.

A EEEEPEEEPEEEPPEEPPEPPPEPPPPPPP
B EEEEEPEEEPEEEPPEEEPPPEPPPEEPPP
C EEPEEEPEEEPEEEPEEEPPEEPPPEEPPP

Molecule A is 36.8 wt. % ethylene, B is 46.6%, and C is 50% ethylene. The average ethylene content for the mixture is 44.3%. For this sample the Inter-CD is such that the highest ethylene polymer contains 5.7% more ethylene than the average, while the lowest ethylene content polymer contains 7.5% less ethylene than the average. Or, in other words, 100 weight % of the polymer is within +5.7% and −7.5% ethylene about an average of 44.3%. Accordingly, the Inter-CD is 7.5% when the given weight % of the polymer is 100%. The distribution may be represented graphically as by curve 1 in FIG. 3 of COZEWITH et al.

If the chains are broken into fragments, there will be a new Inter-CD. For simplicity, consider first breaking only molecule A into fragments shown by the slashes as follows:

EEEEP/EEEPE/EEPPE/EPPEP/PPEPP/PPPPP
Portions of 72.7%, 72.7%, 50%, 30.8%, 14.3% and 0% ethylene are obtained. If molecules B and C are similarly broken and the weight fraction of similar composition are grouped, the new Inter-CD shown by curve 2 in FIG. 3 is obtained. The difference between the two curves in the figure is due to Intra-CD.

Consideration of such data, especially near the end point ranges, demonstrates that for this sample at least 5% of the chain contour represented by the cumulative weight % range (a) differs in composition from another section by at least 15% ethylene shown as (b), the difference between the two curves. The difference in composition represented by (b) cannot be intermolecular. If it were, the separation process for the original polymer would have revealed the higher ethylene contents seen only for the degraded chain.

The compositional differences shown by (b) and (d) in the figure between original and fragmented chains give minimum values for Intra-CD. The Intra-CD must be at least that great, for chain sections have been isolated which are the given difference in composition (b) or (d) from the highest or lowest composition polymer isolated from the original. We know in this example that the original polymer represented at (b) had sections of 72.7% ethylene and 0% ethylene in the same chain. It is highly likely that, due to the inefficiency of the fractionation process, any real polymer with Intra-CD examined will have sections of lower or higher ethylene connected along its contour than that shown by the end points of the fractionation of the original polymer. Thus, this procedure determines a lower bound for Intra-CD. To enhance the detection, the original whole polymer can be fractionated (e.g., separate molecule A from molecule B from molecule C in the hypothetical example) with these fractions refractionated until they show no (or less) Inter-CD. Subsequent fragmentation of this intermolecularly homogeneous fraction now reveals the total Intra-CD. In principle, for the example, if molecule A were isolated, fragmented, fractionated and analyzed, the Intra-CD for the chain sections would be 72.7%–0%=72.7% rather than 72.7%–50%=22.7% seen by fractionating the whole mixture of molecules A, B, and C.

In order to determine the fraction of a polymer which is intramolecularly heterogeneous in a mixture of polymer combined from several sources, the mixture must be separated into fractions which show no further heterogeneity upon subsequent fractionation. These fractions are subsequently fractured and fractionated to reveal polymer heterogeneity.

The fragments into which the original polymer is broken should be large enough to avoid end effects and to give a reasonable opportunity for the normal statistical distribution of segments to form over a given monomer conversion range in the polymerization. Intervals of ca 5 weight % of the polymer are convenient. For example, at an average polymer molecular weight of about $10^5$, fragments of ca 5000 molecular weight are appropriate. A detailed mathematical analysis of plug flow or batch polymerization indicates that the rate of change of composition along the polymer chain contour will be most severe at high ethylene conversion near the end of the polymerization. The shortest fragment are needed here to show the low propylene content sections.

The best available technique for determination of compositional dispersity for non-polar polymers is solvent/non-solvent fractionation which is based on the thermodynamics of phase separation. This technique is described in "Polymer Fractionation", M. Cantow editor, Academic 1967, p. 341 ff and in H. Inagaki, T. Tanaku, *Developments in Polymer Characterization*, 3, 1 (1982). These are incorporated herein by reference.

For non-crystalline copolymers of ethylene and propylene, molecular weight governs insolubility more than does composition in a solvent/non-solvent solution. High molecular weight polymer is less soluble in a given solvent mix. Also, there is a systematic correlation of molecular weight with ethylene content for the polymers described herein. Since ethylene polymerizes much more rapidly than propylene, high ethylene polymer also tends to be high in molecular weight. Additionally, chains rich in ethylene tend to be less soluble in hydrocarbon/polar non-solvent mixture than propylene-rich chains. Thus the high molecular weight, high ethylene chains are easily separated on the basis of thermodynamics.

A fractionation procedure is as follows: Unfragmented polymer is dissolved in n-hexane at 23° C. to form ca a 1% solution (1 g polymer/100 cc hexane). Isopropyl alcohol is titrated into the solution until turbidity appears at which time the precipitate is allowed to settle. The supernatant liquid is removed and the precipitate is dried by pressing between Mylar ® (polyethylene terphthalate) film at 150° C. Ethylene content is determined by ASTM method D-3900. Titration is resumed and subsequent fractions are recovered and analyzed until 100% of the polymer is collected. The titrations are ideally controlled to produce fractions of 5–10% by weight of the original polymer especially at the extremes of composition.

To demonstrate the breadth of the distribution, the data are plotted as % ethylene versus the cumulative weight of polymer as defined by the sum of half the weight % of the fraction of that composition plus the total weight % of the previously collected fractions.

Another portion of the original polymer is broken into fragments. A suitable method for doing this is by thermal degradation according to the following procedure: In a sealed container in a nitrogen-purged oven, a 2 mm thick layer of the polymer is heated for 60 minutes at 330° C. This should be adequate to reduce a $10^5$ molecular weight polymer to fragments of ca 5000 molecular weight. Such degradation does not change the average ethylene content of the polymer. This polymer is fractionated by the same procedure as the high molecular weight precursor. Ethylene content is measured, as well as molecular weight on selected fractions.

Ethylene content is measured by ASTM-D3900 for ethylene-propylene copolymers between 35 and 85 wt. % ethylene. Above 85% ASTM-D2238 can be used to obtain methyl group concentrations which are related to percent ethylene in an unambiguous manner for ethylene-propylene copolymers. When comonomers other than propylene are employed, no ASTM tests covering a wide range of ethylene contents are available; however, proton and carbon 13 nuclear magnetic resonance can be employed to determine the composition of such polymers. These are absolute techniques requiring no calibration when operated such that all nuclei contribute equally to the spectra. For ranges not covered by the ASTM tests for ethylene-propylene copolymers, these nuclear magnetic resonance methods can also be used.

Molecular weight and molecular weight distribution are measured using the Waters 150 gel permeation chromatograph equipped with a Chromatix KMX-6 on-line light scattering photometer. The system is used at 135° C. with 1, 2, 4-trichlorobenzene as mobile phase. Showdex (Showa-Denko America, Inc.) polystyrene gel columns 802, 803, 804 and 805 are used. This technique is discussed in "Liquid Chromatography of Polymers and Related Material III", J. Cazes editor, Marcel Dekker, 1981, p. 207 (incorporated herein by reference). No corrections for column spreading are employed; however, data on generally accepted standards, e.g., National Bureau of Standards Polyethene 1484 and anionically produced hydrogenated polyisoprenes (an alternating ethylene-propylene copolymer) demonstrate that such corrections on $\overline{M}_w/\overline{M}_n$ or $\overline{M}_z/\overline{M}_w$ are less than 0.05 unit. $\overline{M}_w/\overline{M}_n$ is calculated from an elution time-molecular weight relationship whereas $\overline{M}_z/\overline{M}_w$ is evaluated using the light scattering photometer. The numerical analyses can be performed using the commercially available computer software GPC2, MOLWT2 available from LDC/Milton Roy-Riviera Beach, Fla.

Amounts of the halogen-containing monomers present are easily determined by routine analytical tests for the halogen content of the polymer.

The average ethylene content of the polymer could be as low as about 10% on a weight basis. The preferred minimum is about 25%. A more preferred minimum is about 30%. The maximum ethylene content could be about 90% on a weight basis. The preferred maximum is about 85%, with the most preferred being about 80%. The ethylene content of the two segments comprising the polymer can be the same or different. If different, the preferred composition range for each segment is the same as stated above for the whole polymer.

The molecular weight of copolymer made in accordance with the present invention can vary over a wide range. It is believed that the weight average molecular weight could be as low as about 2,000. The preferred minimum is about 10,000. The most preferred minimum is about 20,000. It is believed that the maximum weight average molecular weight could be as high as about 12,000,000. The preferred maximum is about 1,000,000. The most preferred maximum is about 750,000. The preferred minimum molecular weight for an ethylene-propylene copolymer chain segment is $2 \times 10^4$. For the ethylene-propylene-non-conjugated diene chain segment the preferred minimum MW is $2 \times 10^3$.

Solution polymerizations are preferred for the polymerization process of this invention. Any known solvent for the reaction mixture that is effective for the purpose can be used. For example, suitable solvents would be hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Nonlimiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichlorethane and trichloroethane.

The polymerization process is preferably carried out in a mix-free reactor system, which is one in which substantially no mixing occurs between portions of the reaction mixture that contain polymer chains initiating at different times. Suitable reactors are a continuous flow tubular or a stirred batch reactor. A tubular reactor is well known and is designed to minimize mixing of the reactants in the direction of flow. As a result, reactant concentration will vary along the reactor length. In contrast, the reaction mixture in a continuous flow stirred tank reactor (CFSTR) is blended with the incoming feed to produce a solution of essentially uniform composition everywhere in the reactor. Consequently, the growing chains in a portion of the reaction mixture will have a variety of ages and thus a single CFSTR is not suitable for the process of this invention. However, it is well known that 3 or more stirred tanks in series with all of the catalyst fed to the first reactor can approximate the performance of a tubular reactor. Accordingly, such tanks in series are considered to be in accordance with the present invention, and as being the functional equivalent of the tubular reactor.

A batch reactor is a suitable vessel, preferably equipped with adequate agitation, to which the catalyst, solvent, and monomer are added at the start of the polymerization. The charge of reactants is then left to polymerize for a time long enough to produce the desired product. For economic reasons, a tubular reactor is preferred to a batch reactor for carrying out the processes of this invention.

In addition to the importance of the reactor system to make copolymers in accordance with the present invention, the polymerization should be preferably conducted such that:

a. the catalyst system produces essentially one active catalyst species, b. the reaction mixture is essentially free of chain transfer agents, and c. the polymer chains are essentially all initiated simultaneously, which is at the same time for a batch reactor or at the same point along the length of the tube for a tubular reactor.

The desired polymer can be obtained if more than one feed or solvent and reactants (e.g., at least one of the ethylene, alpha-olefin, non-conjugated diene, and olefinic chlorosilane or olefinic hydrocarbon halide) are added either at at least one point along the length of a tubular reactor or during the course of polymerization in a batch reactor. Operating in this fashion is desirable to control the polymerization rate in the polymer composition. However, it is necessary to add essentially all of the catalyst at the inlet of the tube or at the onset of batch reactor operation to meet the requirement that essentially all polymer chains are initiated simultaneously.

Accordingly, processes in accordance with the present invention are most preferably carried out:

(a) in at least one mix-free reactor, (b) using a catalyst system that produces essentially one active catalyst species, (c) using at least one reaction mixture which is essentially transfer agent-free, and (d) in such a manner and under conditions sufficient to initiate propagation of essentially all polymer chains simultaneously.

Since the tubular reactor is the preferred reactor system for carrying out processes in accordance with the present invention, the following illustrative descriptions and examples are drawn to that system, but will apply to other reactor systems as will readily occur to the artisan having the benefit of the present disclosure.

In practicing processes in accordance with the present invention, use is preferably made of at least one tubular reactor. Thus, in its simplest form, such a process would make use of but a single reactor. However, as would readily occur to the artisan having the benefit of the present disclosure, more than one reactor could be used, either in parallel for economic reasons, or in series with multiple monomer feed to vary intramolecular composition.

For example, various structures can be prepared by adding additional monomer(s) during the course of the polymerization. This is exemplified in FIG. 4 of COZEWITH et al., wherein composition is plotted versus position along the contour length of the chain for multiple monomer additions during polymerization of the ethylene-propylene copolymer chain segment. The Intra-CD of curve 1 is obtained by feeding all of the monomers at the tubular reactor inlet or at the start of a batch reaction. In comparison, the Intra-CD of curve 2 can be made by adding additional ethylene at a point along the tube, or, in a batch reactor, where the chains have reached about half of their final length. The Intra-CD's of curve 3 requires multiple feed additions. The Intra-CD of curve 4 can be formed if additional comonomer rather than ethylene is added. This structure permits a whole ethylene composition range to be omitted from the chain. In each case, a third or more alpha-olefin comonomers or olefinic chlorosilane, or olefinic hydrocarbon halide, may be added. The segment distribution can be controlled thusly.

The composition of the catalyst used to produce alphaolefin copolymers has a profound effect on copolymer product properties such as compositional dispersity and MWD. The catalyst utilized in practicing processes in accordance with the present invention should be such as to yield essentially one active catalyst species in the reaction mixture. More specifically, it should yield one primary active catalyst species which provides for substantially all of the polymerization reaction. Additional active catalyst species could be present, provided the copolymer product is in accordance with the present invention, e.g., narrow MWD and Inter-CD. It is believed that such additional active catalyst species could provide as much as 35% (weight) of the total copolymer. Preferably, they should account for about 10% or less of the copolymer. Thus, the essentially one active species should provide for at least 65% of the total copolymer produced, preferably for at least 90% thereof. The extent to which a catalyst species contributes to the polymerization can be readily determined using the below-described techniques for characterizing catalyst according to the number of active catalyst species.

Techniques for characterizing catalyst according to the number of active catalyst species are within the skill of the art, as evidenced by an article entitled "Ethylene-Propylene Copolymers. Reactivity Ratios, Evaluation and Significance", C. Cozewith and G. VerStrate, Macromolecules, 4, 482 (1971), which is incorporated herein by reference.

It is disclosed by the authors that copolymers made in a continuous flow stirred reactor should have an MWD characterized by $\overline{M}_w/\overline{M}_n=2$ and a narrow Inter-CD when one active catalyst species is present. By a combination of fractionation and gel permeation chromatography (GPC) it is shown that for single active species catalysts the composition of the fractions vary no more than ±3% about the average and the MWD (weight to number average ratio) for these samples approaches two (2). It is this latter characteristic ($\overline{M}_w/\overline{M}_n$ of about 2) that is deemed the more important in identifying a single active catalyst species. On the other hand, other catalysts gave copolymer with an Inter-CD greater than ±10% about the average, and multimodal MWD with a $\overline{M}_w/\overline{M}_n$ value greater than about 2. These other catalysts are deemed to have more than one active species.

Catalyst systems to be used in carrying out processes in accordance with the present invention may be Ziegler copolymerization catalysts, which may typically include:

(a) a compound of a transition metal, i.e., a metal of Groups I-B, III-B, IVB, VB, VIB, VIIB, and VIII of the Periodic Table, and (b) an organometal compound of a metal of Groups I-A, II-A, II-B, and III-A of the Periodic Table.

The preferred catalyst system in practicing processes in accordance with the present invention comprises hydrocarbon-soluble vanadium compound in which the vanadium valence is 3 to 5 and organo-aluminum compound, with the provision that the catalyst system yields essentially one active catalyst species as described above. At least one of the vanadium compound/organo-aluminum pair selected must also contain a valence-bonded halogen.

In terms of formulas, vanadium compounds useful in practicing processes in accordance with the present invention could be:

(1)

where $x=0-3$ and $R=$ a hydrocarbon radical;
$VCl_4$;
$VO(AcAc)_2$,
where AcAc=acetyl acetonate;
$V(AcAc)_3$;

$$VOCl_x(AcAc)_{3-x} \quad (2)$$

where
$x=1$ or 2; and
$VCl_3.nB$ where $n=2-3$ and B=Lewis base capable of making hydrocarbon-soluble complexes with $VCl_3$, such as tetrahydrofuran, 2-methyl-tetrahydrofuran and dimethyl pyridine.

In formula 1 above, R preferably represents a $C_1$ to $C_{10}$ aliphatic, alicyclic or aromatic hydrocarbon radical such as ethyl (Et), phenyl, isopropyl, propyl, n-butyl, i-butyl, t-butyl, hexyl, cyclohexyl, octyl, naphthyl, etc. Non-limiting illustrative examples of formula (1) compounds are vanadyl trihalides, alkoxy halides and alkoxides such as $VOCl_3$, $VOCl_2(OBu)$ where Bu=butyl, and $VO(OC_2H_5)_3$. The most preferred vanadium compounds are $VCl_4$, $VOCl_3$, and $VOCl_2(OR)$.

As already noted, the co-catalyst is preferably organo-aluminum compound. In terms of chemical formulas, these compounds could be as follows:

| | |
|---|---|
| $AlR_3$, | $Al(OR')R_2$ |
| $Al R_2Cl$, | $R_2Al—O—AlR_2$ |
| $AlR'RCl$, | $AlR_2I$ |

-continued

| | |
|---|---|
| Al$_2$R$_3$Cl$_3$, | |
| AlRCl$_2$, | and mixtures thereof | where R and R' represent hydrocarbon radicals, the same or different, as described above with respect to the vanadium compound formula. The most preferred organo-aluminum compound is an aluminum alkyl sesquichloride such as Al$_2$Et$_3$Cl$_3$ or Al$_2$(iBu)$_3$Cl$_3$.

In terms of performance, a catalyst system comprised of VCl$_4$ and Al$_2$R$_3$Cl$_3$, preferably where R is ethyl, has been shown to be particularly effective. For best catalyst performance, the molar amounts of catalyst components added to the reaction mixture should provide a molar ratio of aluminum/vanadium (Al/V) of at least about 2. The preferred minimum Al/V is about 4. The maximum Al/V is based primarily on the considerations of catalyst expense and the desire to minimize the amount of chain transfer that may be caused by the organo-aluminum compound (as explained in detail below). Since, as is known, certain organo-aluminum compounds act as chain transfer agents, if too much is present in the reaction mixture the $\overline{M}_w/\overline{M}_n$ of the copolymer may rise above 2. Based on these considerations, the maximum Al/V could be about 25; however, a maximum of about 17 is more preferred. The most preferred maximum is about 15.

Chain transfer agents for the Ziegler-catalyzed polymerization of alpha-olefins are well known and are illustrated, by way of example, by hydrogen or diethyl aluminum chloride, or diethyl zinc, for the production of EPM and EPDM. Such agents are very commonly used to control the molecular weight of EPM and EPDM produced in continuous flow stirred reactors. For the essentially single active species Ziegler catalyst systems used in accordance with the present invention, addition of chain transfer agents to a CFSTR reduces the polymer molecular weight but does not affect the molecular weight distribution. On the other hand, chain transfer reactions during tubular reactor polymerization in accordance with the present invention broaden polymer molecular weight distribution.

Chains which terminate prior to addition of the at least one halogen-containing monomer will not contain the monomer. Thus, the presence of chain transfer agents in the reaction mixture should be minimized or omitted altogether. Although difficult to generalize for all possible reactions, the amount of chain transfer agent used should be limited to those amounts that provide copolymer product in accordance with the desired limits as regards MWD and compositional dispersity. It is believed that the maximum amount of chain transfer agent present in the reaction mixture could be as high as about 0.2 mol/mol of transition metal, e.g., vanadium, again provided that the resulting copolymer product is in accordance with the desired limits as regards MWD and compositional dispersity. Even in the absence of added chain transfer agent, chain transfer reactions can occur because propylene and the organo-aluminum co-catalyst can also act as chain transfer agents. In general, among the organo-aluminum compounds that in combination with the vanadium compound yield just one active species, the organo-aluminum compound that gives the highest copolymer molecular weight at acceptable catalyst activity should be chosen. Furthermore, if the Al/V ratio has an effect on the molecular weight of copolymer product, that Al/V should be used which gives the highest molecular weight also at acceptable catalylst activity. Chain transfer with propylene can best be limited by avoiding excessive temperature during the polymerization as described below.

Molecular weight distribution and Inter-CD are also broadened by catalyst deactivation during the course of the polymerization which leads to termination of growing chains. It is well known that the vanadium-based Ziegler catalysts used in accordance with the present invention are subject to such deactivation reactions which depend to an extent upon the composition of the catalyst. Although the relationship between active catalyst lifetime and catalyst system composition is not known at present, for any given catalyst, deactivation can be reduced by using the shortest residence time and lowest temperature in the reactor that will produce the desired monomer conversions.

When catalyst deactivation is occurring, the feed of the halogen containing monomer is preferably added to the reactor at a point during the polymerization where at least 50% of the catalyst is still active. Polymerizations in accordance with the present invention should be conducted in such a manner and under conditions sufficient to initiate propagation of essentially all copolymer chains simultaneously. This can be accomplished by utilizing the process steps and conditions described below.

The catalyst components are preferably premixed, that is, reacted to form active catalyst outside of the reactor, to ensure rapid chain initiation. Aging of the premixed catalyst system, that is, the time spent by the catalyst components (e.g., vanadium compound and organo-aluminum) in each other's presence outside of the reactor, should preferably be kept within limits. If not aged for a sufficient period of time, the components will not have reacted with each other sufficiently to yield an adequate quantity of active catalyst species, with the result of nonsimultaneous chain initiation. Also, it is known that the activity of the catalyst species will decrease with time so that the aging must be kept below a maximum limit. It is believed that the minimum aging period, depending on such factors as concentration of catalyst components, temperature and mixing equipment could be as low as about 0.1 second.

The preferred minimum aging period is about 0.5 second, while the most preferred minimum aging period is about 1 second. While the maximum aging period could be indefinitely long, for the preferred vanadium-/organo-aluminum catalyst system the preferred maximum is at least 500 seconds and possibly about 5000 seconds. A more preferred maximum is about 200 seconds. The most preferred maximum aging period is about 100 seconds. The premixing could be performed at a low temperature such as 40° C. or below. It is preferred that the premixing be performed at 25° or below, with 15° or below being most preferred.

The temperature of the reaction mixture should also be kept within certain limits. The temperature at the reactor inlet should be high enough to provide complete, rapid chain initiation at the start of the polymerization reaction. The length of time that the reaction mixture spends at high temperature must be short enough to minimize the amount of undesirable chain transfer and catalyst deactivation reactions.

Temperature control of the reaction mixture is complicated somewhat by the fact that the polymerization reaction generates large quantities of heat. This problem is, preferably, taken care of by using prechilled feed to the reactor to absorb the heat of polymerizatio. With this technique, the reactor is operated adiabatically and the temperature is allowed to increase during the course of polymerization. As an alternative to feed prechill, heat can be removed from the reaction mixture, for example, by a heat exchanger surrounding at least a portion of the reactor or by well-known autorefrigeration techniques in the case of batch reactors or multiple stirred reactors in series.

If adiabatic reactor operation is used, the inlet temperature of the reactor feed could be about from −50° C. to 140° C. It is believed that the outlet temperature of the reaction mixture could be as high as about 150° C. The preferred maximum outlet temperature is about 70° C. The most preferred maximum is about 50° C. In the absence of reactor cooling, such as by a cooling jacket, to remove the heat of polymerization, the temperature of the reaction mixture will increase from reactor inlet to outlet by an amount dependant on the heat of polymerization, reaction mixture specific heat, and the weight percent of copolymer in the reaction mixture. For ethylene-propylene copolymerization in hexane solvent the temperature rise is about 10° C. per weight percent of copolymer formed.

Having the benefit of the above disclosure, it would be well within the skill of the art to determine the operating temperature conditions for making copolymer in accordance with the present invention. For example, assume an adiabatic reactor and an outlet temperature of 35° C. are desired for a reaction mixture containing 5% copolymer. The reaction mixture will increase in temperature by about 10° C. for each weight percent copolymer or 5 weight percent x 10° C./wt. % =50° C. To maintain an outlet temperature of 35° C., it will thus require a feed that has been prechilled to 35° C. −50° C. = −15° C. In the instance that external cooling is used to absorb the heat of polymerization, the feed inlet temperature could be higher with the other temperature constraints described above otherwise being applicable.

Because of heat removal and reactor temperature limitations, the preferred maximum copolymer concentration at the reactor outlet is 25 wt./100 wt. diluent. The most preferred maximum concentration is 15 wt./100 wt. There is no lower limit to concentration due to reactor operability, but for economic reasons, it is preferred to have a copolymer concentration of at least 2 wt./100 wt. Most preferred is a concentration of at least 3 wt./100 wt.

The rate of flow of the reaction mixture through the reactor should be high enough to provide good mixing of the reactants in the radial direction and minimize mixing in the axial direction. Good radial mixing is beneficial not only to both the Intra- and Inter-CD of the copolymer chains, but also to minimize radial temperature gradients due to the heat generated by the polymerization reaction. Radial temperature gradients will tend to broaden the molecular weight distribution of the copolymer, since the polymerization rate is faster in the high temperature regions resulting from poor heat dissipation. The artisan will recognize that achievement of these objectives is difficult in the case of highly viscous solutions. This problem can be overcome to some extent through the use of radial mixing devices such as static mixers (e.g., those produced by the Kenics Corporation).

It is believed that residence time of the reaction mixture in the mix-free reactor can vary over a wide range. It is believed that the minimum could be as low as about 1 second. A preferred minimum is about 10 seconds. The most preferred minimum is about 15 seconds. It is believed that the maximum could be as high as about 3600 seconds. A preferred maximum is about 1800 seconds. The most preferred maximum is about 900 seconds.

As previously indicated, the composition of copolymer chains of the invention is dependent upon the point at which the various reactants are added to the reactor. In a tubular reactor, the statistical polymer will result if the halogen-containing monomer is added at the reactor inlet and is present along essentially the entire length of the reactor. The segmented copolymer will result if the halogen-containing monomer is instead added at one or more location sites along the reactor with additional ethylene and alpha-olefin appropriately fed; the copolymer chains will bear second segments corresponding to such locations where the olefinic chlorosilane or olefinic hydrocarbon halide is added.

The copolymer chains of the invention can be cross-linked at their chlorosilane or olefinic halide functional groups. Where the third compound in the copolymer is an olefinic chlorosilane, the cross-linking agent is water at least one of the indicated polyfunctional proton donors. Where the halogen-containing monomer is olefinic hydrocarbon halide, the cross-linking agent is zinc oxide or a polyfunctional nucleophile, such as those previously indicated.

The structure of the resulting cross-linked copolymer is also dependent upon the sequence of monomers along the copolymer chains. Where the olefinic chlorosilane or olefinic hydrocarbon halide has been introduced at the reactor inlet, and the olefinic chlorosilane or olefinic hydrocarbon halide is present throughout the chain, cross-linking will accordingly occur throughout the chain. Where the olefinic chlorosilane or olefinic hydrocarbon halide is rather introduced at one or more locations along the reactor, at such addition rates which will cause the formation of copolymer chains having contiguous first and second segments of sufficient length, cross-linking will result in nodular regions of second segments with first segments extending therefrom.

Variations of such nodular copolymer products can be prepared by adding polyfunctional proton donors or polyfunctional nucleophiles which contain additional functional groups. Examples of such functional groups are amides, pyridines, polycaprolactones, pyrrolidone, imidazole, polycaprolactams, etc. Such groups act as dispersants in lube oil compositions.

In the present state of the fiberglass composition art, it is difficult to achieve adequate bonding between the glass fibers and plastic matrix comprising the fiberglass compositions. The copolymer chains of the present invention can be incorporated into fiberglass compositions to improve the bonding of the composition. This improvement results from the reaction attaching the glass fibers to the chlorosilane functionality of the positions of the chains.

The chlorosilyl-containing copolymer chains can be incorporated into the fiberglass compositions by any conventional means. The copolymer chains can be added by coating the glass fibers of the fiberglass composition with the copolymer chains, and reacting the coated compositions with the bonding agent. Alternatively, the copolymer chains can be added to the reaction mixture used in preparing the fiberglass composition, and permit curing with nonconventional agents such as water.

The copolymer chains of the present invention can be used in analogous manner in rubber compositions incorporating fillers such as silicates and carbon black. The copolymer chains act to improve the bonding in the composition by coupling the filler to the rubber.

The copolymers of the present invention can also be used to make block and graft polymers, including compatibilizers and thermoplastic elastomers.

In one embodiment of this process of the invention, the copolymer chains are reacted with a metalating agent, such as a branched alkyl lithium. An anionically polymerizable monomer is then added, which polymerizes anionically to give chains of the monomer grafted onto the ethylene-alpha-olefin copolymer chains.

In another embodiment of the invention, a cationic catalyst, such as a Lewis acid, is reacted with the hydrocarbon halogen functionality on the copolymer chains, and a cationically polymerizable monomer is then added to graft onto the copolymer chains.

The copolymer chains of the present invention can also be reacted with a hydroxy terminated thermoplastic to form a thermoplastic elastomer, if a chlorosilyl is incorporated at each end of the ethlene-alpha-olefin copolymer chain.

A lubricating oil composition in accordance with the present invention comprises a major amount of basestock lubricating oil (lube oil) of lubricating viscosity which contains an effective amount of Viscosity Index improver being a nodular copolymer of ethylene and at least one other alpha-olefin, as described in detail above. More specifically, the chains coupled to form the nodular copolymer should have a MWD characterized by at least one of a ratio of $\overline{M}_w/\overline{M}_n$ of less than 2 and a ratio of $\overline{M}_z/\overline{M}_w$ of less than 1.8. The preferred ratio of $\overline{M}_w/\overline{M}_n$ is less than about 1.6, with less than about 1.4 being preferred. The preferred $\overline{M}_z/\overline{M}_w$ is less than about 1.5, with less than about 1.3 being most preferred.

In one embodiment of the invention, the Intra-CD of the copolymer is such that at least two portions of an individual intramolecularly hetrogeneous chain, each portion comprising at least 5 weight percent of the chain, differ in composition from one another by at least 5 weight percent ethylene. The Intra-CD can be such that at least two portions of copolymer chain differ by at least 10 weight percent ethylene. Difference of at least 20 weight percent, as well as 40 weight percent ethylene, are also considered to be in accordance with the present invention.

In another embodiment of the invention, the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

In a particular embodiment, the copolymer has all of the MWD, Intra-CD and Inter-CD characteristics described above when inforporated in a lubricating oil or oil additive concentrate composition. In current practice, ethylene-propylene copolymer is most preferred. The preferred ethylene content of the copolymer, on a weight basis, for use as a lube oil additive is about from 30% to 75%.

For lube oil additive applications, it is believed that the copolymer could have a weight average molecular weight as low as about 2,000. The preferred minimum is about 15,000, with about 50,000 being the most preferred minimum. It is believed that the maximum weight average molecular weight could be as high as about 12,000,000. The preferred maximum is about 300,000, with about 250,000 being the most preferred maximum. The preferred ethylene content is 30% to 75%.

The nodular copolymers of this invention may be employed in lubricating oils as Viscosity Index improvers or viscosity modifiers in amounts varying broadly from about 0.001 to 49 wt. %. The proportions giving the best results will vary somewhat according to the nature of the lubricating oil basestock and the specific purpose for which the lubricant is to serve in a given case. When used as lubricating oils for diesel or gasoline engine crankcase lubricants, the polymer concentrations are within the range of about 0.1 to 15.0 wt. % of the total composition, which are amounts effective to provide Viscosity Index improvements. Typically, such polymeric additives are sold as oil additive concentrates wherein the additive is present in amounts of about 5 to 50 wt. %, preferably 6 to 25 wt. % based on the total amount of hydrocarbon mineral oil diluent for the additive. The polymers of this invention are typically used in lubricating oils based on a hydrocarbon mineral oil having a viscosity of about 2–40 centistokes (ASTM D-445) at 99° C.; however, lubricating oil basestocks comprised of a mixture of a hydrocarbon mineral oil and up to about 25 wt. % of a synthetic lubricating oil, such as esters of dibasic acids and complex esters derived from monobasic acids, polyglycols, dibasic acids and alcohols, are also considered suitable.

The novel compositions of this invention comprise about 0.05 to about 25 mol % halogen-containing monomer based on the total nodular polymer, preferably about 0.1 to about 15 mol %, more preferably about 0.15 to about 10 mol %. In the process for preparing the nodular copolymer, the halogen-containing monomer is preferably utilized in the reaction mixture at about 0.1 to about 80 wt. % based on the total monomer, more preferably about 0.5 to about 50 wt. %. The most preferred range is 2% to 20%. The novel process to form the nodular polymers of this invention may be more readily appreciated by reference to the following examples.

EXAMPLES

EXAMPLE 1

This Example illustrates the formation of a narrow MWD statistical terpoymer of ethylene, propylene, and 5-trichlorosilyl-2-norbornene. The polymerization reactor is a one-inch diameter pipe fed continuously at one end with monomers, catalyst, cocatalyst, and hexane solvent. The monomers are purified before use by standard techniques to remove polar impurities.

A catalyst solution is prepared by dissolving 18.5 g of $VCl_4$ in 5.0 l of purified hexane. The cocatalyst is 142 g of $Al_2Et_3Cl_3$ dissolved in 5.0 l of purified n-hexane. These two solutions are fed through a catalyst pre-mixing device at a temperature of 0° C. and a residence time of 6 sec., at the flow rates shown in Table I. The premixed catalyst is combined with the monomer dissolved in hexane at the reactor inlet. All flow rates are in Table I. The feed temperature is 0° C. and the reactor is operated to give an outlet temperature of 20° C. Reactor residence time is 30 sec. Pyridine is added to the reactor outlet to quench the polymerization reaction. Solvent and unreacted monomer are removed from the reaction product by vacuum evaporation in a thin film evaporator at 60° C. The final traces of volatiles are removed by devolatizing extrusion, and the product is recovered in an atmosphere of dry air.

The product has a narrow MWD, with $\overline{M}_w/\overline{M}_n = 1.4$, and contains 3.5 wt. % 5-trichlorosilyl-2-norbornene.

EXAMPLE 2

The procedure of Example 1 is repeated, except that the olefinic chlorosilane employed is 5-methyldichlorosilyl-2-norbornene, fed to the reactor at a rate of 0.026 kg/hr. The final product contains 2.2 wt. % of the olefinic chlorosilane, and the $\overline{M}_w/\overline{M}_n$ value is 1.6.

EXAMPLE 3

The polymerization technique of Example 1 is repeated except that the halogen-containing monomer is 5-chloromethyl-2-norbornene, added at a feed rate of 0.030 kg/hr. The polymerization is quenched with water and the solvent and unreacted monomer are removed by steam stripping, which precipitates the polymer in water. After recovery of the wet polymer by screening, it is dried on a hot rubber mill.

The product contains 2.4% of the halogen-containing monomer, and the $\overline{M}_w/\overline{M}_n$ value is 1.4.

EXAMPLE 4

This Example illustrates the preparation of a nodular copolymer having 5-trichlorosilyl-2-norbornene as the olefinic chlorosilane. The polymerization procedure of Example 1 is repeated, except there is no olefinic chlorosilane in the feed. At a point along the reactor length corresponding to a residence time of 20 sec., a second feed consisting of ethylene and the silane termonomer dissolved in hexane is injected. All feed rates are shown in Table II. Eighty percent of the polymer is produced prior to the second feed. The polymer produced after the second feed contains 0.5 wt. % silane termonomer. The polymer exiting the reactor is of narrow MWD with $\overline{M}_w/\overline{M}_n = 1.4$.

The polymerization is quenched by addition of water to the reactor effluent, and the polymer is recovered by steam stripping as described in Example 3. Contact of the polymer with water during product recovery couples the chains through the trichlorosilane functionality, and produces a nodular copolymer.

EXAMPLE 5

This example illustrates the formation of a two segment copolymer.

The polymerization procedure as described in Example 1 is repeated, except that the third compound is 5-parachloromethyl phenyl-2-norbornene (PCPN). The polymerization is allowed to proceed for 1 sec., and then a second feed of ethylene dissolved in hexane is added to the reactor to raise the polymerization rate and increase the conversion of the third compound. At 6 sec. residence time the conversion is essentially complete, and a second monomer feed consisting of ethylene and propylene dissolved in hexane is added to the reactor to form the ethylene-propylene copolymer segment. Reactor conditions are shown in Table III. Forty-nine percent of the polymer is formed prior to the introduction of the third monomer feed stream. The polymerization is quenched at the reactor outlet with water and the solution is extracted with water to remove catalyst residues. The polymer is recovered by steam stripping and drying on a rubber mill. The polymer is of narrow MWD with a $\overline{M}_w/\overline{M}_n$ value of 1.7.

EXAMPLE 6

The polymerization in Example 5 is repeated except the polymer solution, after deashing to remove catalyst residues, is added to a stirred tank vessel to which is fed a hexane solution of 1,5 diaminohexane at a rate 1.2 mol/mol of third compound. The stirred tank is held at 150° C. and 200 p.s.i.g. to maintain a liquid phase and the residence time is 10 min. Under these condition, the chains are coupled via the functionality of the third compound to produce a nodular copolymer, which is recovered by steam stripping and drying.

EXAMPLE 7

The polymer produced in Example 5 is dissolved in dry hexane and the solution is sparged with dry nitrogen to remove any traces of water. A solution of butyl lithium in hexane is added at a ratio of 1.1 mol/mol functional terpolymer in the chain. The butyl lithium exchanges with the chloride functionality in the polymer to generate lithiated polymer. Styrene is then added to the solution at a ratio of 0.3 wt/wt copolymer. The styrene polymerizes annionically to give polystyryl chains grafted on to the ethylene-propylene copolymer.

EXAMPLE 8

The polymerization procedure of Example 5 is repeated, except that multiple monomer feeds are injected along the reactor length as shown in Table IV to produce narrow MWD copolymer chains containing 5-parachloromethylphenyl-2-norbornene at both ends of the chain, and a segment in the center of the chain consisting essentially of only ethylene and propylene. The central segment comprises about 70 wt. % of the chain. The two end segments contain about 1 wt. % PCPN. The polymer, is recovered as in Example 5 and lithiated as in Example 7. Styrene is added to the solution at a ratio of 0.4 wt/wt copolymer and polymerizes anionically to give an ethylene-propylene copolymer with polystyrene grafted on to both ends of the chain. The product has the properties of a thermoplastic elastomer.

TABLE I

| Residence Time Where Feed is Added | Feed Rates (kg/hr)[1] 0 sec.[2] |
|---|---|
| Hexane | 60.9 |
| Ethylene | 0.65 |
| Propylene | 5.5 |
| Halogen-Containing Monomer | 0.036 |

[1]VCl$_4$ = 5.24 g/hr  
Al$_2$Et$_3$Cl$_3$ = 40.4 g/hr } at reactor inlet

[2]Addition at reactor inlet - no time has elapsed in reaction.

TABLE II

| Residence Time Where Feed is Added | Feed Rates (kg/hr)[1] | |
|---|---|---|
| | 0[2] | 20 |
| Hexane | 60.9 | 5.0 |
| Ethylene | 0.65 | 0.25 |
| Propylene | 5.5 | — |
| Halogen-Containing Monomer | — | 0.12 |

[1]VCl$_4$ = 5.24 g/hr  
Al$_2$Et$_3$Cl$_3$ = 40.4 g/hr } at reactor inlet

TABLE II-continued

| Residence Time Where | Feed Rates (kg/hr)[1] | |
|---|---|---|
| Feed is Added | 0[2] | 20 |

[2]Addition at reactor inlet - no time has elapsed in reaction.

TABLE III

| Residence Time Where | Feed Rates (kg/hr)[1] | | |
|---|---|---|---|
| Feed is Added | 0[2] | 1 | 6 |
| Hexane | 30.0 | 2.0 | 30.0 |
| Ethylene | 0.2 | 0.1 | 0.4 |
| Propylene | 3.0 | — | 4.0 |
| Halogen-Containing Monomer | 0.015 | — | — |

[1]$VCl_4$ = 5.24 g/hr  
$Al_2Et_3Cl_3$ = 40.4 g/hr  } at reactor inlet

[2]Addition at reactor inlet - no time has elapsed in reaction.

TABLE IV

| Residence Time Where | Feed Rates (kg/hr)[1] | | | |
|---|---|---|---|---|
| Feed is Added | 0_1 | 1 | 3 | 8 |
| Hexane | 20 | 5 | 25 | 10 |
| Ethylene | 0.1 | 0.05 | 0.5 | 0.1 |
| Propylene | 1.0 | — | 3.0 | 0 |
| Halogen-Containing Monomer | 0.006 | — | — | 0.06 |

[1]$VCl_4$ = 5.24 g/hr  
$Al_2Et_3Cl_3$ = 40.4 g/hr  } at reactor inlet

[2]Addition at reactor inlet - no time has elapsed in reaction.

What is claimed is:

1. A polymerization process for producing a copolymer chain comprising:
   A. a first segment comprising one contiguous segment or a plurality of discontinuous segments of a copolymer of ethylene and an alpha-olefin; and
   B. a second segment comprising a copolymer of ethylene, an alpha-olefin, and at least one halogen-containing monomer selected from the group consisting of:
      (a) an olefinic chlorosilane of the formula $SiRR'_xCl_{3-x}$ wherein
      (i) x is the range 0-2;
      (ii) R is a Ziegler copolymerizable olefin;
      (iii) R' is a hydrocarbon with 1-30 carbon atoms selected from the group consisting of saturated and unsaturated as well as branched and unbranched aliphatic, aromatic, cyclic, and polycyclic hydrocarbons; and
   (b) an olefinic hydrocarbon halide of the formula RR'X wherein:
      (i) R is a Ziegler copolymerizable olefin; and
      (ii) R' is a hydrocarbon with 1-30 carbon atoms selected from the group consisting of saturated and unsaturated as well as branched and unbranched aliphatic, aromatic, cyclic, and polycyclic hydrocarbons; and
      (iii) X is a halogen;
   said second segment constituting less than 50 percent by weight of said copolymer chain, said second segment being in the form of one contiguous segment or a plurality of discontinuous segments;
   said at least one halogen-containing monomer being cross-linkable under conditions which do not cross-link said first segments to any substantial extent; said process comprising:
   I. forming said first segment by polymerizing a reaction mixture of ethylene and alpha-olefin to form said first segment, and
   II. during said polymerization, forming said second segment by incorporating said at least one halogen-containing monomer into said reaction mixture to form said second segment, in an amount such that, at completion of polymerization, said second segment comprises less than 50% of the polymer weight.

2. The process as defined by claim 1 wherein:
   (a) said halogen-containing monomer is incorporated into said reaction mixture a first time;
   (b) polymerization is continued after substantially all of said halogen-containing monomer is reacted; and
   (c) steps (a) and (b) are repeated in sequence at least once;
      whereby both said first segment and said second segment comprise a plurality of discontinuous segments.

3. The process as defined by claim 2 wherein, after the first occurrence of step (b), at least one member selected from the group consisting of ethylene and propylene is added to the reaction mixture.

4. The process as defined by claim 1 wherein the formation of the second segment is conducted after the completion of the formation of the first segment, whereby a copolymer chain consisting of substantially one first segment and substantially one second segment is formed.

5. The process as defined by claim 1 comprising the step of adding a non-conjugated diene to the reaction mixture.

6. The process as defined by claim 1 comprising the step of incorporating at least one of additional ethylene, alpha-olefin, non-conjugated diene, and halogen-containing monomer into the reaction mixture after initiation of the polymerization.

7. The process as defined by claim 1 comprising polymerizing said ethylene, alpha-olefin, and at least one halogen-containing monomer reaction mixture with essentially one catalyst species in at least one mix-free reactor in such a manner and under conditions sufficient to initiate propagation of substantially all the copolymer chains simultaneously to form said plurality of said copolymer chains, wherein the copolymer chains are dispersed within the reaction mixture, and wherein the reaction mixture is essentially transfer-agent free.

8. The process as defined by claim 7 comprising conducting the polymerization in a tubular reactor.

9. The process as defined by claim 8 further comprising injecting additional reaction mixture comprising at least one of ethylene, other alpha-olefin monomer, non-conjugated diene, and said at least one halogen-containing monomer at at least one location along said reactor.

10. The process as defined by claim 9 wherein the alpha-olefin is propylene.

11. The process defined by claim 9 comprising forming a copolymer chain wherein the first segment comprises the center of the copolymer chain, and the second segment comprises two segments, one at each end of the copolymer chain, by:
   (a) introducing a reaction mixture comprising ethylene, propylene, and at least one halogen-containing monomer at the reactor inlet, and introducing said at least one halogen-containing monomer at a second location along the reactor to produce the second segment; and
(b) introducing a reaction mixture comprising a compound selected from the group consisting of at least one of ethylene and propylene at a first location along the reactor, said first location being between the inlet and the second location to form said first segment.

* * * * *